No. 701,804. Patented June 3, 1902.
T. A. EDISON.
REVERSIBLE GALVANIC BATTERY.
(Application filed June 20, 1901.)
(No Model.)
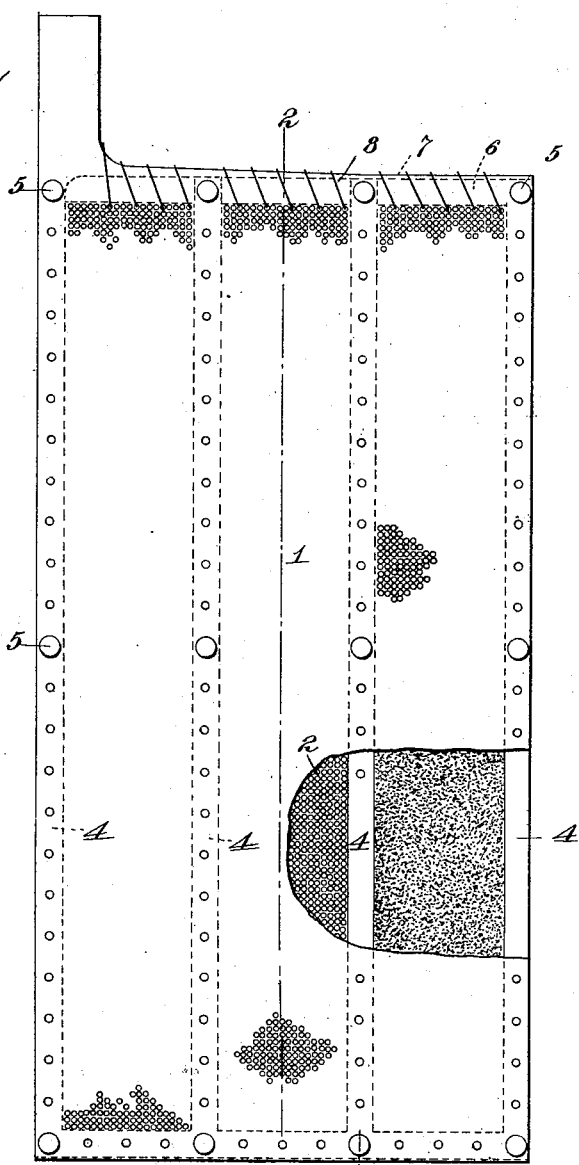
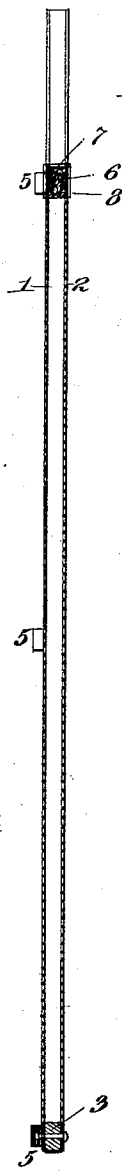
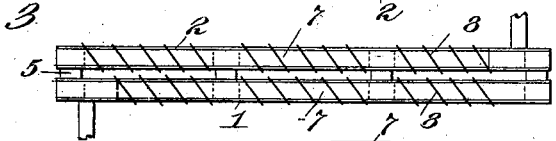
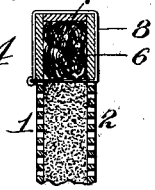
Witnesses:
Jno. F. Coleman
Jno. R. Taylor
Inventor
Thomas A. Edison.
by Dyer Edmonds & Dyer
Att'ys.

UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 701,804, dated June 3, 1902.

Original application filed March 1, 1901, Serial No. 49,453. Divided and this application filed June 20, 1901. Serial No. 65,285. (No model.)

*To all whom it may concern:*

Be it known that I, THOMAS A. EDISON, a citizen of the United States, and a resident of Llewellyn Park, in the county of Essex and State of New Jersey, have invented a certain new and useful Improvement in Reversible Galvanic Batteries, (Case No. 1,061,) of which the following is a description.

The object of my present invention is to produce a reversible galvanic battery of the type invented by me wherein insoluble active elements are employed with a solution which remains unchanged during all conditions of use, the battery being of great permanence and of remarkably light weight per unit of power.

In batteries having alkaline electrolytes as commercially used, so far as I know, copper oxid has heretofore been employed exclusively as the depolarizing material, the copper being reduced to the metallic state upon discharging. The only other elements which have been suggested and which have been available as substitutes for copper in these batteries have been those lower in the electrolytic series, such as mercury and silver; but, so far as I know, these materials have not been satisfactorily or commercially utilized on account of the difficulties arising from their application in alkaline electrolytes, as well as because of their expense, especially in regard to silver, which metal possesses the further disadvantage of being quite soluble in the electrolyte when subjected to oxidation. I have sought by a great many experiments for an element or compound capable of being used in an alkaline electrolyte, the heat of formation of whose oxid should be as low or lower than that of oxid of mercury, and in this I have been successful, the result being the discovery of an element for furnishing the oxygen to the oxidizable element on discharge with even greater freedom than oxid of mercury, while at the same time the new element is less expensive, is of less weight, is of greater permanency, and, finally, is of greater insolubility in the electrolyte.

My improved oxygen-furnishing or depolarizing material may be employed in connection with any oxidizable element—such as cadmium, copper, or iron—prepared, preferably, in special ways, as I shall describe.

My invention therefore consists of the combination of an electrolyte, such as a potassic-hydroxid solution, which remains unchanged during all conditions of working, and two elements therein insoluble in such electrolyte, the depolarizing element having for its active material an electrolytically-active oxid of nickel or cobalt, preferably the former.

The invention further consists of the new depolarizer for use in any suitable type of galvanic battery and which I define in language of varying breadth in the appended claims.

The elements are preferably carried or supported by hollow perforated plates, forming receptacles or pockets, which are illustrated in the accompanying drawings, forming part of this specification, and in which—

Figure 1 is a face view of one of the plates having three pockets or receptacles, showing the front wall partly broken away. Fig. 2 is a section on the line 2 2 of Fig. 1. Fig. 3 is a plan showing two of the plates forming a single combination, and Fig. 4 an enlarged detailed section.

In all of the above views corresponding parts are represented by the same numerals of reference.

Each plate is formed with two walls 1 and 2 constructed, preferably, of a single continuous sheet made, preferably, of very thin sheet-nickel—say about .005 of an inch in thickness—and bent at its bottom around a horizontal frame 3, from which extend the vertical spacing-frames 4 4, to all of which frames the sheet is secured by means of nickel rivets, as shown, to form a strong rigid hollow plate with pockets or receptacles between the vertical frames 4 4. The walls 1 and 2 of the plate, as shown, are perforated with small holes arranged very closely together and each about .015 of an inch in diameter. I prefer to use nickel in the construction of the plates, since that metal is not oxidizable by electric oxidation in an alkaline solution. Iron, on the other hand, is slightly oxidized under these conditions and is not so desirable, but if very carefully and perfectly plated with nickel it may be used satisfactorily for the construction of either the plates or the frames. Obviously the frames 3 and 4 may be and in some instances preferably are constructed of hard rubber or other inert material, to which the perforated sheet is riveted, as explained. Secured to one or both of the sides of the plate are a number of insulated spacing-blocks 5 5 to prevent adjacent plates from touching when immersed in the electrolyte.

Having described a suitable construction of supporting-plates or pockets for the active materials, reference will now be made to the preferred oxygen furnishing or storing element—i. e., the depolarizer of the cell.

I have discovered by experiment that the hydrated lower oxids of nickel and cobalt when in contact with a conductor in an alkaline solution can be almost wholly raised from this lower to a higher stage of oxidation electrolytically than is possible by chemical means and that these higher oxids revert to a lower stage by reduction with extreme ease, and availing myself of this fact I have constructed an oxygen storing or depolarizing element capable of great capacity, of small weight, and of high permanence. Neither the oxid of nickel nor of cobalt is appreciably soluble in an alkaline electrolyte and both nickel and cobalt give nearly the same voltage in use; but since nickel is less expensive than cobalt I prefer to use the former element for the purpose.

A suitable process of making the oxygen-storing element consists in first precipitating either the monoxid or black hydrated dioxid of the metal—say nickel—in the usual way, washing the precipitate free from the products of the reaction, filtering off the liquid, and drying the precipitate. The resulting dried hydrated oxid, which is electrolytically active, is then powdered very fine and is ready for use. Either oxid may be used with the same results. The process above outlined applies to cobalt as well as to nickel. About seven parts, by weight, of the finely-powdered hydrate and three parts, by weight, of flake graphite are then intimately mixed and moistened with a small quantity of a strong solution of potassic hydroxid, so as to dampen the mass, which is then inserted in the pockets or receptacles of the proper plates in small quantities at a time and thoroughly tamped at each accession. Finally the mass is covered with a layer of asbestos 6, held in place by a plate of nickel 7, secured in position by nickel wires 8, threaded through openings near the top of the pockets. The plates the pockets of which are thus supplied with the mixture of the electrolytically-active oxid and graphite are then immersed in a solution of potassic hydroxid in water and subjected for a considerable time to an oxidizing current of about fifty milliamperes per square inch of surface, during which the oxid is either raised to a higher stage of oxidation than the black peroxid ($Ni_2O_3$) or else acts as an absorber of oxygen in some manner unknown to me. Whatever the action may be the oxid so treated acts as a most efficient oxygen-storing element for commercial use in a galvanic battery.

The object of employing graphite, which is not affected by electrolytic oxidation, is to offer a great extent of surface against which the whole of the oxid is in contact, a large conducting-surface being necessary, since the electrolytic reduction and oxidation for practical purposes only extend a small distance from the conducting-surface, against which the oxid is in contact. This is admirably effected by the use of graphite in its micaceous form, the proportions indicated being such as to practically insure that the electrolytic action need not penetrate a greater distance from the contact-surface than the thickness of a single particle of the powdered oxid. Furthermore, there is no local action between the nickel or cobalt oxids and the graphite.

The reason why nickel hydrate is preferably used instead of other compounds of nickel is that the metal itself when finely divided (as obtained by reducing a nickel compound by hydrogen or electrolysis) is not oxidizable to any considerable extent when subjected to electrolytic oxidation in an alkaline solution. The sulfid of nickel is not decomposed by electrolysis under the conditions of battery-work and the sulfid of cobalt only imperfectly. Hence the hydrates are the most available compounds for use, since they do not become inert to the same extent as hydrates of the oxids of iron after drying, they are easily prepared, and by absorbing the solution they swell within the pockets or receptacles, so as to insure intimate contact and stability. During the charging of the cell the absorption of oxygen by the oxid of nickel or cobalt causes the oxid to further swell and bulge the pockets or receptacles outwardly, and on discharge a proportionate contraction takes place. In order that the walls of the pockets or receptacles may always maintain the desirable intimate contact with the active material, the pockets are, as stated, made of some highly-elastic metal, such as hard-rolled sheet-nickel, so that at each contraction of the mass the pocket-walls will by their elasticity keep in contact therewith. Owing to the considerable changes in bulk to which the electrolytically-active oxid of nickel or cobalt is subject, it is of importance that the latter should be confined within conducting-supports which elastically accommodate any variations of the mass. If the attempt were made to apply the oxid—for instance, as a paste to a conducting-plate or in other unconfined ways—the oxid in swelling and contracting would very rapidly disintegrate, so as to become dislodged.

For the oxidizable element of my improved reversible cell I may employ either iron, cadmium, or copper, processes for the preparation of which will be described. If iron is used, I may follow the process described in my Patent No. 678,722, dated July 16, 1901, in which I first take monosulfid of iron and reduce it by a crushing operation until the particles thereof may be passed through a screen having about forty thousand openings per square inch, and I intimately mix about eight parts, by weight, of the powdered monosulfid with about two parts, by weight, of flake-graphite of a size considerably larger than the perforations in the walls of the pockets or receptacles. Flake-graphite being exceedingly thin and of large area gives an extensive conducting-surface in proportion to its bulk and weight. This mixture is then moistened with a twenty-per-cent. solution of potassic hydroxid, and the dampened mass is packed into the pockets or receptacles of the proper plates by a suitable tamping-tool. Owing to the want of flexibility of the graphite, the mixture packs to a hard porous mass. The effect of electrolytic gassing, therefore, does not disintegrate the mass as a whole when properly compressed. After each pocket or receptacle has been tightly packed with the mass almost to its top a wad of asbestos fiber 6 about a quarter of an inch in thickness is introduced into the pocket or receptacle above the mass, and on top of this packing is placed a strip of sheet-nickel 7, entirely covering the asbestos and filling the mouth of the pocket, which strip is permanently secured in position by nickel wires 8, threaded through the openings near the top of the pocket, as shown particularly in Fig. 2 and as I have described in connection with the depolarizing electrode. The element thus formed is subjected to electrolytic oxidization in a solution of potassic hydroxid, whereby sulfur will be set free and combining with the alkali forms a sulfid of potassium, which diffuses out of the mass, while the iron is converted to a ferrous oxid, which is insoluble in the solution and is electrolytically active. This diffusion of the alkaline sulfid out of the plate is hastened and facilitated by subjecting the contents of the plate to alternate oxidization and reduction by alternately reversing the oxidizing-current, and by several of these operations the whole of the sulfur will be eliminated and the element will be ready for use after the iron has been reduced to the metallic state. Since iron does not decompose water, there will obviously be no local action between it and the graphite. The oxid formed from the sulfid increases in bulk and being intermediately mixed with the graphite produces considerable pressure on the walls of the plate, which prevents any disturbance of the initial state of the mass even when it is subjected to strong gassing within the pores by overcharging the element electrically. The object of using the monosulfid is to secure the greatest amount of iron oxid in the smallest space and in a form capable of being reduced to the metallic state electrolytically.

Instead of employing electrolytically active finely-divided iron as the oxidizable element cadmium may be used for the purpose, as I describe in my application for Letters Patent filed October 31, 1900, Serial No. 34,994. When cadmium is used, it is preferably obtained by an electrodeposition process, a very thin platina wire being used as the cathode, a plate of metallic cadmium as the anode, and a weak solution of sulfate of cadmium as the electrolyte. By employing a strong current in the electrolyte with a small platina wire as the cathode, as explained, the cadmium will be deposited thereon in its metallic state, exceedingly finely divided and filamentary in form and of great purity. The deposited finely-divided cadmium is detached from time to time from the cathode and is washed in water to remove any adhering sulfate of cadmium, after which it may be packed in the pockets between the plates 1 and 2, being held in position by a layer of asbestos 6 and a nickel cover 7, as explained in connection with the use of iron. When cadmium is employed, its high conductivity makes it unnecessary to admix a flake-like conducting material with the cadmium, as is desirable with iron.

If copper is used as the oxidizable element instead of either iron or cadmium, it may be obtained as I describe in my application for Letters Patent filed on even date herewith, Serial No. 65,288, (Edison No. 1,064,) by first reducing pure carbonate of copper in the usual way by hydrogen at the lowest possible temperature that will insure perfect reduction, after which the finely-divided copper so obtained is subjected in an open chamber to a temperature of not over 500° Fahrenheit for six or seven hours until the copper is converted into its black oxid, (CuO.) This oxid is then mixed with flake-graphite or other inert conducting material in the proportion of seven parts, by weight, of the oxid to three parts, by weight, of the flake-graphite and the mixture lightly packed in the pockets or receptacles of the plates, being secured in place as described. When subjected to the effect of electrolytic reduction, the black oxid will be reduced to the metallic form, and in the subsequent discharging operation the copper will be oxidized to the red oxid, ($Cu_2O$.)

The two elements of the battery are preferably utilized in a solution of twenty-five per cent. of potassic hydroxid in water, and the cell is ready for use. When charged, the hydrated nickel or cobalt oxid will be raised to its superperoxid state, and the oxidizable elements (iron, cadmium, or copper) will be reduced to the metallic condition. When the battery is discharged, the nickel or cobalt oxid will revert to a lower stage, the iron (if used) will be raised to the ferrous condition of oxidation, the cadmium (if used) will be raised to the oxid of cadmium, and the copper (if used) will be raised to the red oxid, ($Cu_2O$.)

My improved battery can be overcharged, fully discharged, or even reversed and charged in the opposite direction without any injury. Overgassing does not disturb the initial state of the materials in the pockets. All the ingredients are insoluble, the supporting-plates are unattacked by electrolytic oxidation, and the whole operation is independent of the strength of the solution, so that the battery is of great permanence, while at the same time more energy will be stored per unit of weight than with any other permanent practical combination heretofore suggested.

I have constructed a battery employing hydrated oxid of nickel and electrolytically-active iron, as above described, which gives an available storage capacity of one-horse-power hour for seventy-three pounds weight; but it may be made lighter without destroying its permanent character.

The specific magnetic metals are iron, nickel, and cobalt. By the expression "oxid of a specific magnetic metal other than iron" as employed in my claims I mean oxid of nickel, oxid of cobalt, or a combination of such oxids. By the use of that expression it is my purpose to embrace and include generically both of these available oxids. I shall also specifically claim oxid of nickel herein, and I have specifically claimed oxid of cobalt in my application for Letters Patent filed March 1, 1901, Serial No. 49,452.

I do not claim herein the specific combination of oxid of nickel or cobalt and electrolytically-active finely-divided iron or iron oxid, as that combination is claimed in my application, Patent No. 678,722, dated July 16, 1901. I do not claim herein the specific combination of oxid of nickel or cobalt and cadmium, as that specific combination is claimed in my Patent No. 692,507, dated February 4, 1902, and I do not claim herein the specific combination of oxid of nickel or cobalt and copper, as that specific combination is claimed in my application filed on even date herewith, Serial No. 65,288; but What I do claim, and desire to secure by Letters Patent, is as follows:

1. An active element for a reversible galvanic battery, comprising a conducting-support, an electrolytically-active oxid of a specific magnetic metal other than iron carried by said support, and a flake-like inert conducting material intimately mixed with said oxid, substantially as set forth.

2. An active element for a reversible galvanic battery, comprising a conducting-support, an electrolytically-active oxid of a specific magnetic metal other than iron carried by said support, and flake-graphite intimately mixed with said oxid, substantially as set forth.

3. An active element for a reversible galvanic battery, comprising a conducting-support, an oxid of nickel carried thereby having more oxygen than $Ni_2O_3$, and an inert flake-like conducting material intimately mixed with said oxid, substantially as set forth.

4. An active element for a reversible galvanic battery, comprising a conducting-support, an oxid of nickel carried thereby having more oxygen than $Ni_2O_3$, and flake-graphite intimately mixed with said oxid, substantially as set forth.

5. An active element for a reversible galvanic battery, comprising a conducting-support, a hydrated oxid of nickel carried thereby, and a flake-like inert conducting material intimately mixed with said oxid, substantially as set forth.

6. An active element for a reversible galvanic battery, comprising a conducting-support, a hydrated oxid of nickel carried thereby, and flake-graphite intimately mixed with said oxid, substantially as set forth.

7. In a reversible galvanic battery, the combination of an electrolyte which remains unchanged during all conditions of working, and two elements therein insoluble in such electrolyte, the depolarizing element having for its active material an electrolytically-active oxid of a specific magnetic metal other than iron, substantially as set forth.

8. In a reversible galvanic battery, the combination of an electrolyte which remains unchanged during all conditions of working, and two elements therein insoluble in such electrolyte, the depolarizing element having for its active material an electrolytically-active oxid of a specific magnetic metal other than iron and in a condition of oxidation higher than the peroxid state, substantially as set forth.

9. In a reversible galvanic battery, the combination of an alkaline electrolyte which remains unchanged during all conditions of working, a conducting-support therein, an insoluble oxidizable material carried by said support, a second conducting-support employing a receptacle having perforated walls, and a hydrated oxid of a specific magnetic metal other than iron carried within said receptacle, substantially as set forth.

10. In a reversible galvanic battery, the combination of an alkaline electrolyte which remains unchanged during all conditions of working, a conducting-support therein, an insoluble oxidizable material carried by said support, a second conducting-support, a hydrated oxid of a specific magnetic metal other than iron carried by said second support, and a flake-like inert conducting material intimately mixed with said oxid, substantially as set forth.

11. In a reversible galvanic battery, the combination of an alkaline electrolyte which remains unchanged during all conditions of working, a conducting-support therein, an insoluble oxidizable material carried by said support, a second conducting-support, a hydrated oxid of a specific magnetic metal other than iron carried by said second support, and flake-graphite intimately mixed with said oxid, substantially as set forth.

12. In a reversible galvanic battery, the combination of an electrolyte which remains unchanged during all conditions of working, and two elements therein insoluble in such electrolyte, the depolarizing element having for its active material an electrolytically-active oxid of nickel, substantially as set forth.

13. In a reversible galvanic battery, the combination of an alkaline electrolyte which remains unchanged during all conditions of working, a conducting-support therein, an insoluble oxidizable material carried by said support, a second conducting-support, and an oxid of nickel carried thereby having more oxygen than $Ni_2O_3$, substantially as set forth.

14. In a reversible galvanic battery, the combination of an alkaline electrolyte which remains unchanged during all conditions of working, a conducting-support therein, an insoluble oxidizable material carried by said support, a second conducting-support employing a receptacle having perforated walls, and an oxid of nickel carried within said receptacle and having more oxygen than $Ni_2O_3$, substantially as set forth.

15. In a reversible galvanic battery, the combination of an alkaline electrolyte which remains unchanged during all conditions of working, a conducting-support therein, an insoluble oxidizable material carried by said support, a second conducting-support, an oxid of nickel carried thereby having more oxygen than $Ni_2O_3$, and an inert conducting material intimately mixed with said oxid, substantially as set forth.

16. In a reversible galvanic battery, the combination of an alkaline electrolyte which remains unchanged during all conditions of working, a conducting-support therein, an insoluble oxidizable material carried by said support, a second conducting material, an oxid of nickel carried thereby having more oxygen than $Ni_2O_3$, and an inert flake-like conducting material intimately mixed with said oxid, substantially as set forth.

17. In a reversible galvanic battery, the combination of an alkaline electrolyte which remains unchanged during all conditions of working, a conducting-support therein, an insoluble oxidizable material carried by said support, a second conducting-support, an oxid of nickel carried thereby having more oxygen than $Ni_2O_3$, and flake-graphite intimately mixed with said oxid, substantially as set forth.

18. In a reversible galvanic battery, the combination of an alkaline electrolyte which remains unchanged during all conditions of working, a conducting-support therein, an insoluble oxidizable material carried by said support, a second conducting-support, a hydrated oxid of nickel carried thereby, and a flake-like inert conducting material intimately mixed with said oxid, substantially as set forth.

19. In a reversible galvanic battery, the combination of an alkaline electrolyte which remains unchanged during all conditions of working, a conducting-support therein, an insoluble oxidizable material carried by said support, a second conducting-support, a hydrated oxid of nickel carried thereby, and flake-graphite intimately mixed with said oxid, substantially as set forth.

This specification signed and witnessed this 17th day of June, 1901.

THOMAS A. EDISON.

Witnesses:
FRANK L. DYER,
RICHD. N. DYER.